United States Patent [19]

Suzuki et al.

[11] Patent Number: 4,557,046

[45] Date of Patent: Dec. 10, 1985

[54] SYSTEM FOR AUTOMATICALLY ARRANGING ENDS OF WIRES OF CONNECTOR CABLE IN PREDETERMINED ORDER

[75] Inventors: Fumio Suzuki, Funabashi; Toshio Ohnuma, Narita; Kazuyuki Koga, Sakura; Tatsuya Watanabe, Chiba, all of Japan

[73] Assignee: Fujikura Ltd., Tokyo, Japan

[21] Appl. No.: 611,222

[22] Filed: May 17, 1984

[30] Foreign Application Priority Data

May 20, 1983 [JP] Japan ............................ 58-75795[U]
May 20, 1983 [JP] Japan ............................ 58-75797[U]

[51] Int. Cl.[4] .............................................. B23P 19/00
[52] U.S. Cl. ....................................... 29/749; 140/105
[58] Field of Search .......................... 29/749, 759, 461; 140/105, 147

[56] References Cited

U.S. PATENT DOCUMENTS 4,409,734 10/1983 Baraglia et al. ....................... 29/749

OTHER PUBLICATIONS

International Wire & Cable Symposium Proceedings 1980—"Automatic Connectorization of 25 Pair Cable", pp. 178–187.

*Primary Examiner*—Howard N. Goldberg
*Assistant Examiner*—L. Selman
*Attorney, Agent, or Firm*—Sprung Horn Kramer & Woods

[57] ABSTRACT

An automatic wire end arranging system includes a wire holder for holding one ends of the wires, a wire feed device for feeding the wire ends one by one from the wire holder, and a transport device for transporting each wire end from the wire feed device to an arranging device. The arranging device includes a fixture having a plurality of parallel receptive sections, and a table mounted adjacent to the fixture and having a slit, a probe device operable to make electrical contact with the wire end, fed to the table by the transport device, to feed a probe signal, a first drive device operable to move the table, a second drive device operable to bring the wire end on the table into alignment with the slit, and a third drive device operable to urge the wire end, disposed in alignment with the slit, into a selected one of the receptive sections through the slit. A control device, to which the other ends of the wires are electrically connected, is responsive to the probe signal to operate the first drive device to move the table, thereby bringing the slit into alignment with the selected receptive sections corresponding to the probed wire. The control device is responsive to the probe signal to operate the second and third drive devices to bring the wire end into alignment with the slit and to urge the wire end into the selected receptive sections through the slit.

4 Claims, 22 Drawing Figures

SYSTEM FOR AUTOMATICALLY ARRANGING ENDS OF WIRES OF CONNECTOR CABLE IN PREDETERMINED ORDER

BACKGROUND OF THE INVENTION

1. Field of the Invention

This invention relates to a system for automatically arranging ends of wires of a connector cable in a predetermined order for connection to an electrical connector.

2. Prior Art

Generally, connector cables each having a number of wires have been extensively used to interconnect devices or portions in a computer system. In this case, to interconnect two such devices, terminals of one device must be accurately connected to corresponding terminals of the other device, respectively. Such a connector cable has a pair of connectors attached to opposite ends thereof. For attaching the connector to the connector cable, the operator first identifies the wires of the connector cable individually by code coloring and/or marks on the wires of the cable and then manually arranges one ends of the wires in a predetermined order. Then, as shown in FIG. 1, the one ends of the wires 1*a* so arranged are fixed with respect to one another by an adhesive tape T, and then the ends of the wires 1*a* retained in the predetermined order are connected to the connector. However, in the case where the connector cable 1 has a considerable number of wires, it has been complicated to properly connect the wires to the connector, since the identity of the wires is carried out by the operator in accordance with the color coding and/or marks. There are therefore occasions when one or more wires are connected to wrong terminals of the connector. For this reason, after the two connectors are attached to the opposite ends of the connector cable, the connector cable must be tested to determine whether any wrong electrical connection is made.

SUMMARY OF THE INVENTION

It is therefore an object of this invention to provide a wire end arranging system by which a considerable number of wires of a connector cable can be automatically arranged accurately in a predetermined order for connection to an electrical connector.

According to the present invention, there is provided a system for automatically arranging ends of wires of a connector cable in a predetermined order which comprises a wire holder for holding one ends of the wires; a wire feed means operable to feed the wire ends one by one from the wire holder; a transport means operable to transport each wire end from the wire feed means; an arranging means including (i) a fixture mounted on a base and having a plurality of parallel receptive sections formed in a surface thereof in a preselected manner and disposed in a common plane, (ii) a table mounted on the base adjacent to the fixture and having a slit formed therethrough and extending parallel to the receptive sections, the table being movable in a direction perpendicular to the receptive sections in parallel relation to the common plane, each wire end being moved on to the table by the transport means, (iii) a probe means operable to make electrical contact with a of the wire end to feed a probe signal, (iv) a first drive means operable to move the table, (v) a second drive means operable to bring the wire end into alignment with the slit, and (vi) a third drive means operable to urge the wire end, disposed in alignment with the slit, into a selected one of the receptive sections through the slit; and a control means to which the other ends of the wires are electrically connected, the control means being responsive to the probe signal to operate the first drive means to move the table, thereby bringing the slit of the table into alignment with the selected receptive sections of the fixture corresponding to the probed wire end, the control means being responsive to the probe signal to operate the second and third drive means to bring the wire end into alignment with the slit and to urge the wire end into the selected receptive sections through the slit.

DESCRIPTION OF THE PREFERRED EMBODIMENTS OF THE INVENTION

Figure 2:
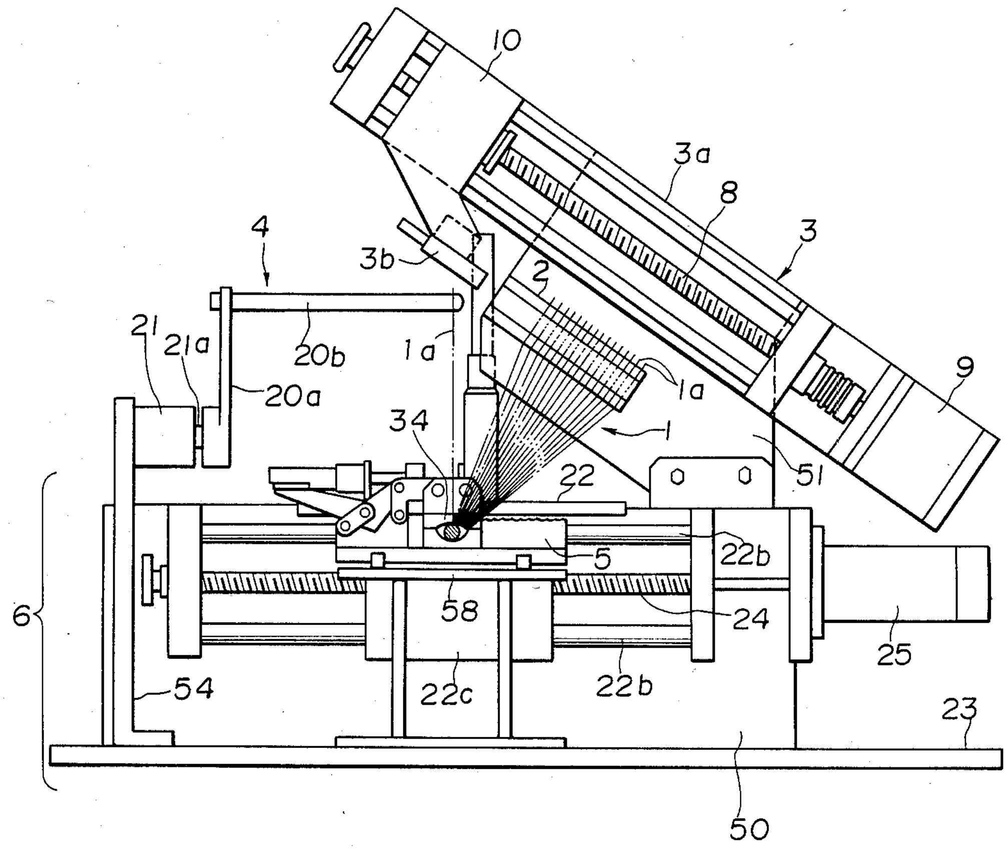
FIG. 2 is a front elevational view of a wire end arranging system provided in accordance with the present invention.
Figure 3:
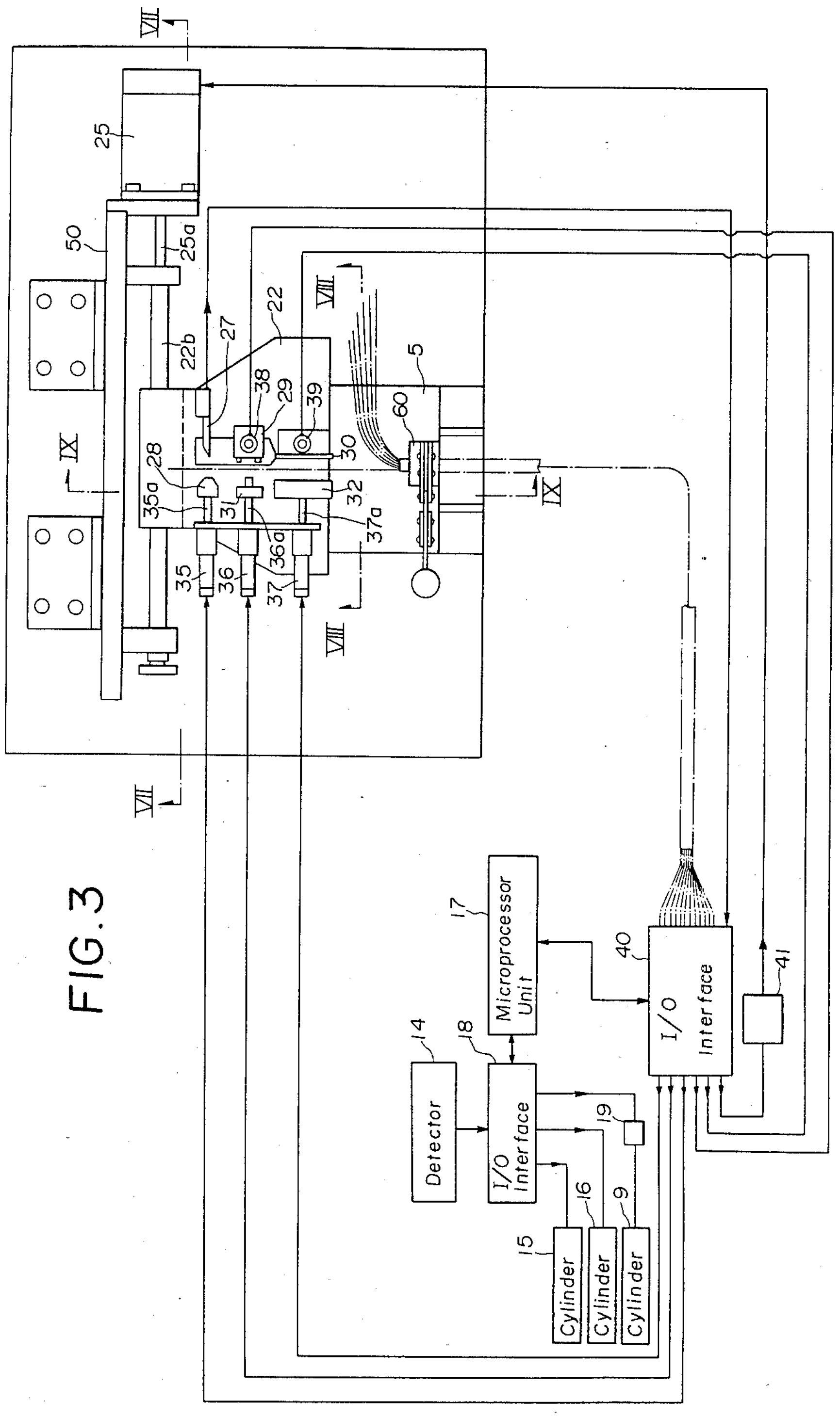
FIG. 3 is a plan view of the wire end arranging system.

A system for automatically arranging ends of wires 1*a* of a connector cable 1 is shown in FIGS. 2 and 3 and comprises a wire holder 2 for holding one ends of the wires 1*a* of the cable 1 in juxtaposed relation, a feed means 3 for feeding the wire ends one by one from the wire holder 2, an arranging means 6 for arranging the wires 1*a* on a fixture 5 in a predetermined order, and a transport means 4 for transporting each wire 1*a* from the feed means 3 to the arranging means 6.

Figure 1:
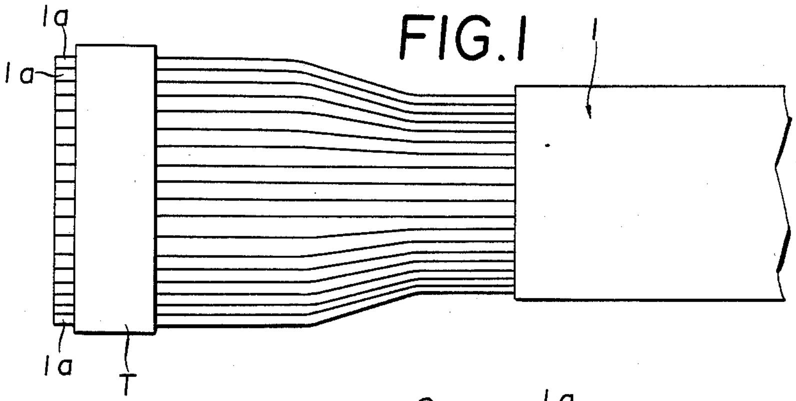
FIG. 1 is a plan view of one end of a connector cable, showing wires thereof fixed with respect to one another by an adhesive tape.
Figure 4:
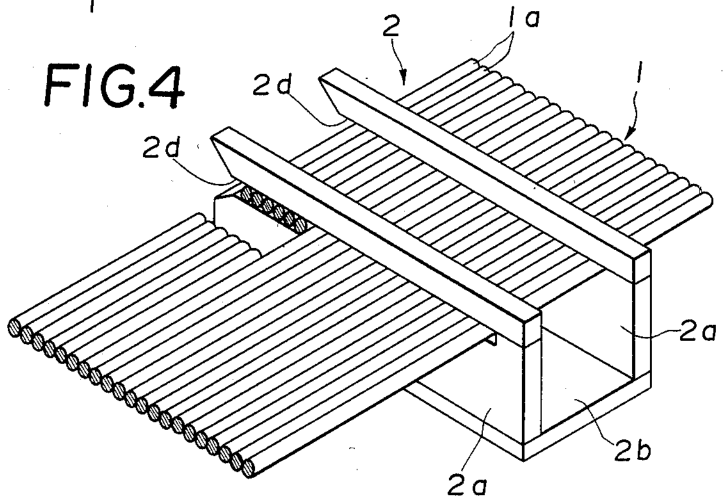
FIG. 4 is a perspective view of a wire holder.

As shown in FIG. 4, the wire holder 2 comprises an elongated body of a U-shaped cross-section defined by a pair of parallel spaced arms 2*a* and 2*a* and a base portion 2*b* interconnecting the arms at their one ends. The wire holder 2 is mounted on a vertical mounting plate 50 through a support plate 51, the mounting plate 50 being mounted on a horizontal base 23. The arms 2*a* and 2*a* have aligned slots 2*d* and 2*d* into which the ends of the wires 1*a* are inserted in parallel juxtaposed relation, the ends of the wires 1*a* being disposed perpendicular to the arms 2*a* and 2*a*.

As shown in FIG. 2, the feed means 3 comprises an elongated frame 3*a*, an externally-threaded shaft 8 mounted on the frame 3*a* and disposed parallel to the axis of the wire holder 2, a stepping motor 9 mounted on one end of the frame 3*a* operatively connected to one end of the threaded shaft 8 for driving it for rotation about its axis, and a bracket 10 threaded on the threaded shaft 8 for movement therealong when the threaded shaft 8 is driven by the stepping motor 9.

Figure 5A:
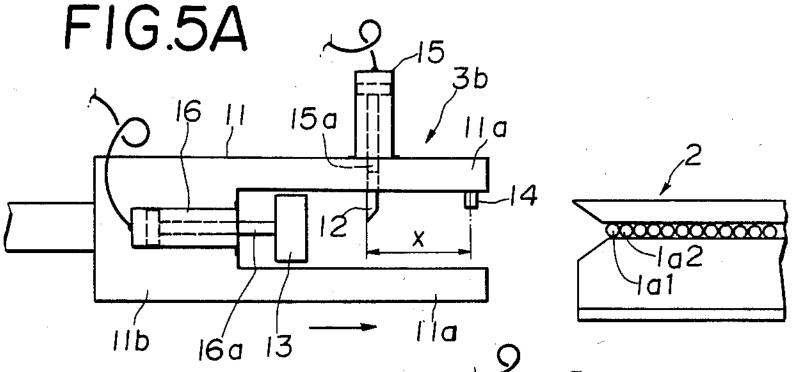
FIGS. 5A to 5D are schematic views showing the operation of a pick-up unit.
Figure 5B:
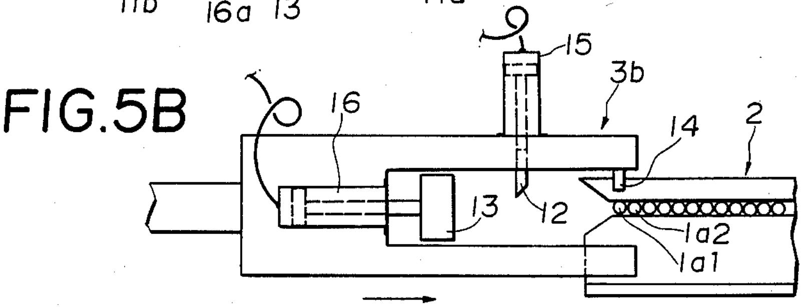

As shown in FIGS. 5A to 5B, a pick-up unit 3*b* comprises a U-shaped elongated body 11 mounted on the movable bracket 10 and having a pair of parallel spaced arms 11*a* and 11*a* and a base portion 11*b* interconnecting the arms 11*a* and 11*a*, the U-shaped body 11 being disposed in alignment with the wire holder 2 in such a manner that the body 11 is movable in between the pair of arms 2*a* and 2*a* of the wire holder 2. The plane in which the aligned slots 2*d* and 2*d* of the wire holder 2 lie is disposed between and parallel to the pair of arms 11*a* and 11*a* of the pick-up unit 3*b*. A detector 14 such as a photodetector is mounted on one arm 11*a* for detecting an outermost one 1*a*1 of the wires 1*a* held by the wire holder 2. A pneumatic cylinder 15 is mounted on the one arm 11*a* and has a piston rod 15*a* operatively associated with the cylinder 15. A separator finger 12 is fixedly secured to the free end of the piston rod 15*a* for movement toward and away from the other arm 11*a*. Another pneumatic cylinder 16 is mounted on the base 11*b* and has a piston rod 16*a* operatively associated with the cylinder 16. The piston rod 16*a* is disposed intermediate the pair of arms 11*a* and 11*a*, and a clamp plate 13 is fixedly secured to the free end of the piston rod 16*a*.

The pneumatic cylinders 15 and 16 include control devices. The detector 14 and the pneumatic cylinders 15 and 16 are connected to a control means or microprocessor unit 17 via I/O interface 18. The stepping motor 9 is also connected to the microprocessor unit 17 via a pulse generator 19 and the I/O interface 18. The pneumatic cylinders 15 and 16 and the stepping motor 9 are operated under the control of the microprocessor unit 17.

The operation of the pick-up unit 3*b* will now be described.

(i) The separator finger 12 and the clamp plate 13 are held in their retracted positions (FIG. 5A).

(ii) Then, the stepping motor 9 of the feed means 3 is operated via the pulse generator 19 to rotate the threaded shaft 8 so that the movable bracket 10 is moved along the shaft 8 to bring the pick-up unit 3*b* toward the wire holder 2 y(FIG. 5B) so that the detector 14 detects the outermost wire 1*a*1 to feed a detecting signal to the microprocessor unit 17 via the I/O interface 18.

(iii) The microprocessor unit 17 is responsive to the detecting signal of the detector 14 to stop the stepping motor 9 after the pick-up unit 3*b* advances further by a predetermined distance L. In other words, the stepping motor 9 is de-energized a predetermined time after the detector 14 detects the outermost wire 1*a*1. The distance L is represented by the following:

ti $L=X+D/2+\alpha$ wherein X is a distance between the detector 14 and the separator finger 12 and D is the diameter of the wire 1*a*1, and $\alpha$ is a value determined by a delay in response of the detector 14 and/or the amount of movement of the pick-up unit 3*b* due to inertia force thereof after the de-energization of the stepping motor 9. Therefore, upon de-energization of the stepping motor 9, the separator finger 12 is disposed in a plane in which the adjacent wires 1*a*1 and 1*a*2 are in contact.

Figure 5C:
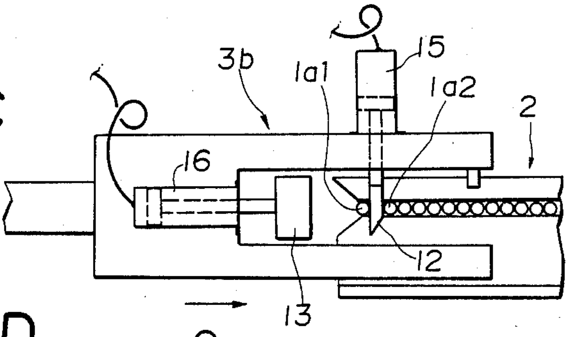
Figure 5D:
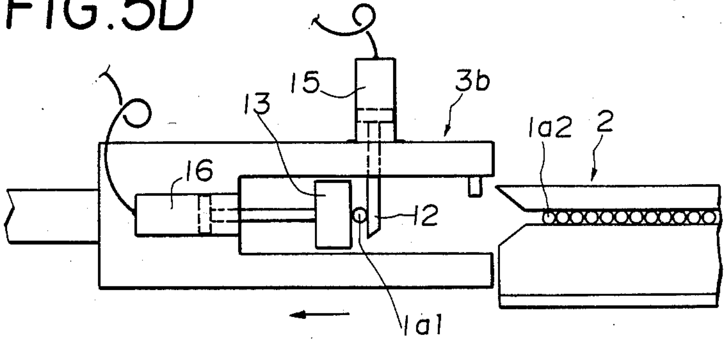

(iv) Then, the microprocessor unit 17 is responsive to the detecting signal to operate the pneumatic cylinder 15 to move the separator finger 12 in between the adjacent wires 1*a*1 and 1*a*2 to separate them (FIG. 5C).

(v) Then, the microprocessor unit 17 is responsive to the detecting signal to operate the pneumatic cylinder 16 to extend its piston rod 16*a* to move the clamp plate 13 toward the separator finger 12 so that the wire 1*a*1 is sandwiched and gripped by the separator finger 12 and the clamp plate 13.

(vi) Then, the microprocessor unit 17 is responsive to the detecting signal to operate the stepping motor 9 to rotate the threaded shaft 8 to move the end of the wire 1*a*1 away from the wire holder 2 into a stand-by position where the wire end is held vertically for engagement by the transport means 4 as hereinafter more fully described.

Figure 6:
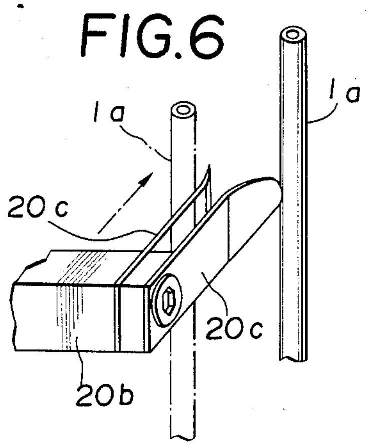
FIG. 6 is a fragmentary view of a transport means, showing a pair of resilient holder plates.

As shown in FIG. 2, the transport means 4 comprises a rotary actuator 21 mounted on the base 23 through a support plate 54, a first link 20*a* fixedly secured to a drive shaft 21*a* of the rotary actuator 21, and a second link 20*b* secured to the first link 20*a* and disposed at right angles with respect thereto. The axis of the drive shaft 21*a* is disposed horizontally in parallel relation to the second link 20*b*. As shown in FIG. 6, a pair of parallel spaced holder plates 20*c* and 20*c* of a resilient material are fixedly secured to the free end of the second link 20*b* and disposed at right angles with respect thereto, the free ends of the holder plates 20*c* and 20*c* being directed away from each other for facilitating the insertion of the wire end thereinto. The rotary actuator 21 is operated to angularly move the first and second links 20*a* and 20*b* about the axis of the drive shaft 21*a* so that the opposed holder plates 20*c* and 20*c* are fitted on and resiliently holds the wire 1*a*1 held in its stand-by position by the pick-up unit 3*b* (FIG. 2). Then, the first and second links 20*a* and 20*b* are further angularly moved by the rotary actuator 21 toward a table 22 of the arranging means 6 together with the wire 1*a*1 as hereinafter more fully described. The microprocessor unit 17 controls the operation of the stepper motor 21.

Figure 7:
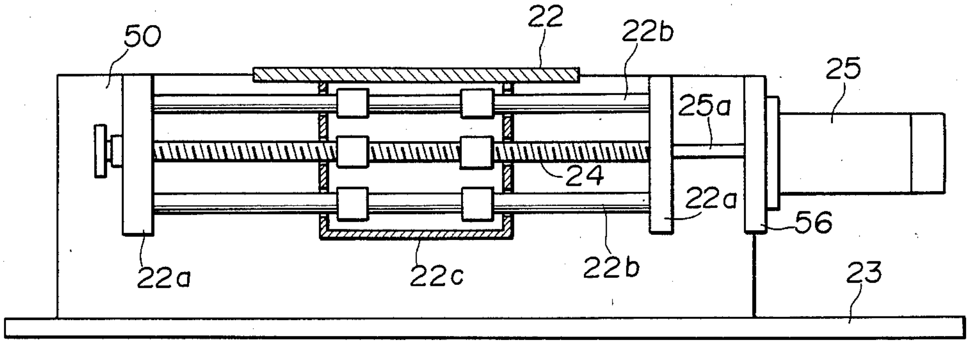
FIG. 7 is a cross-sectional view taken along the line VII—VII of FIG. 3.
Figure 8A:
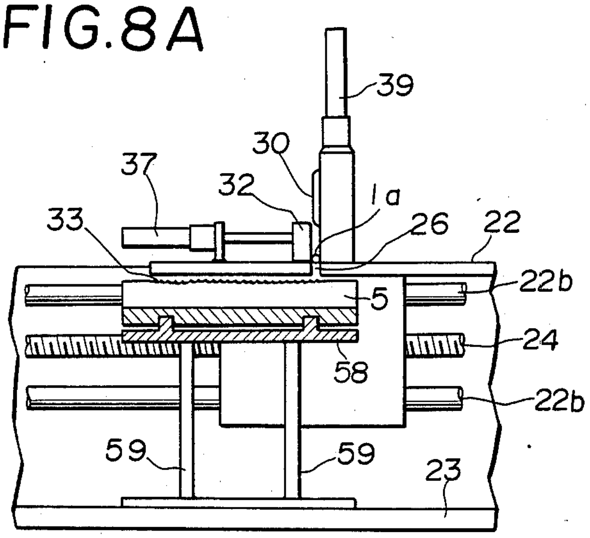
FIGS. 8A and 8B are cross-sectional views taken along the line VIII—VIII of FIG. 3.
Figure 8B:
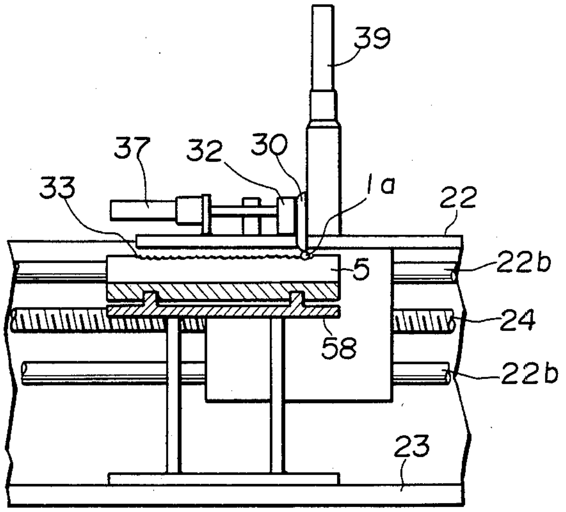

The arranging means 6 will now be described. As best shown in FIG. 7, a pair of support plates 22*a* and 22*a* are mounted on the mounting plate 50, and a pair of horizontal guide rods 22*b* and 22*b* horizontally extend between and are fixed to the pair of support plates 22*a* and 22*a*. A threaded rod 24 also extends between and is borne by the pair of support plates 22*a* and 22*a* for rotation about its axis, the threaded rod 24 being disposed intermediate the pair of guide rods 22*b* and 22*b* in parallel relation thereto. The threaded rod 24 and the pair of guide rods 22*b* and 22*b* are disposed in vertical registry with one another. A stepping motor 25 is mounted on the mounting plate 50 through a bracket 56, and a drive shaft 25*a* of the stepping motor 25 is connected to the threaded rod 24 for rotating it about its axis. The threaded rod 24 and the pair of guide rods 22*b* and 22*b* extend through a support box 22*c*, and the threaded rod 24 threadedly engages the support box 22*c* so that upon rotation of the threaded rod 24, the support box 22*c* is moved therealong. The horizontal table 22 is fixedly mounted on a top of the support box 22*c* and has a slit 26 for passing the wire 1*a* therethrough as best shown in FIGS. 8A and 8B.

As shown in FIG. 3, a blade-like electrode or probe 27 and a horizontally-disposed pneumatic cylinder 35 are mounted on the table 22 in opposed relation to each other. A press element 28 is secured to a free end of a piston rod 35a of the pneumatic cylinder 35 for pressing the wire 1a against the blade-like electrode 27 so that the blade-like electrode 27 cuts through the insulation of the wire 1a and makes electrical contact with a conductor thereof to feed a probe signal. The blade-like electrode 27 is connected to the microprocessor unit 17 via I/O interface 40, so that the wire 1a can be identified through the microprocessor unit 17.

A horizontally-disposed pneumatic cylinder 36 and a vertically-disposed pneumatic cylinder 38 are mounted on the table 22 in opposed relation. A keeper plate 29 is secured to a piston of the pneumatic cylinder 38 for vertical movement, the keeper plate 29 having a pair of downwardly-directed hook 29a and 29a (FIG. 9) for engagement with the wire 1a as hereinafter more fully described. A press element 31 is secured to a free end of a piston rod 36a of the pneumatic cylinder 36 for movement toward and away from the keeper plate 29.

A horizontally-disposed pneumatic cylinder 37 and a vertically-disposed pneumatic cylinder 39 are mounted on the table 22 in opposed relation. A press plate 30 is secured to a piston of the pneumatic cylinder 39 for vertical movement. A press element 32 is secured to a free end of a piston rod 37a of the pneumatic cylinder 37 for movement toward and away from the press plate 30 as hereinafter more fully described.

Figure 9:
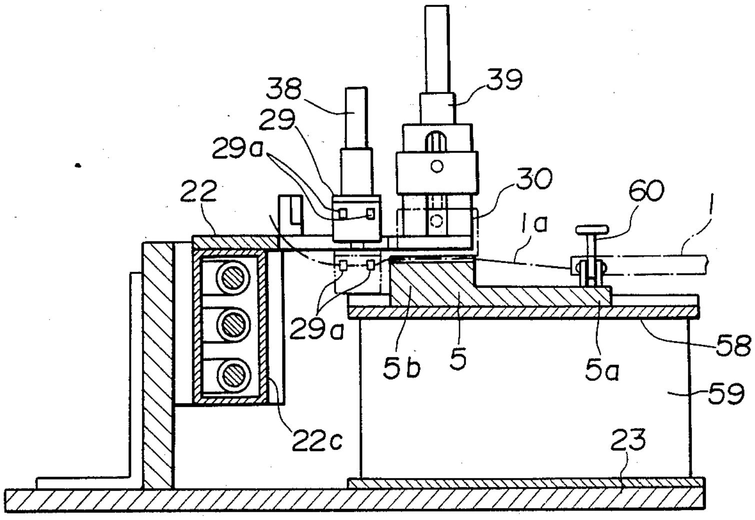
FIG. 9 is a cross-sectional view taken along the line IX—IX of FIG. 3.

As best shown in FIGS. 8A and 8B, a horizontal support plate 58 is mounted on the base 23 through vertical plates 59 and 59. The fixture 5 is mounted on the support plate 58 and, as shown in FIG. 9 the fixture 5 has a base portion 5a and a raised portion 5b formed on one end of the base portion 5a. The raised portion 5b is positioned beneath the table 22. A number of parallel grooves or receptive sections 33 for receiving the ends of the wires 1a are formed in a horizontal top surface of the raised portion 5b of the fixture 5, the grooves 33 extending perpendicular to the threaded rod 24 along which the table 22 is movable. The slit 26 formed through the table 22 is disposed immediately adjacent to the pneumatic cylinder 39 and extends parallel to the grooves 33 of the fixture 5. A clamp member 60 is mounted on the base portion 5a of the fixture 5 for holding the cable 1 adjacent to one end thereof. The sheath of one end of the cable 1 is removed to expose the wires 1a, and these wires 1a are adapted to be held by the wire holder 2 as described above. The sheath of the other end of the cable 1 is also removed to expose the wires 1a, and these wires 1a are connected to terminals (not shown) of the I/O interface 40. The stepping motor 25 is connected to the microprocessor unit 17 via a pulse generator 41 and the I/O interface 40. The pneumatic cylinders 35 to 39 including respective control devices are also connected to the microprocessor unit 17 via the I/O interface 40. The motor 25 and the pneumatic cylinders 35 to 39 are operated under the control of the microprocessor unit 17.

The first and second links 20a and 20b of the transport means 4 are angularly moved by the rotary actuator 21 to bring the wire 1a, held by the opposed holder plates 20c and 20c, toward the table 22 so that the wire 1a lies flat on the table 22.

The operation of the arranging means 6 will now be described.

Figure 10A:
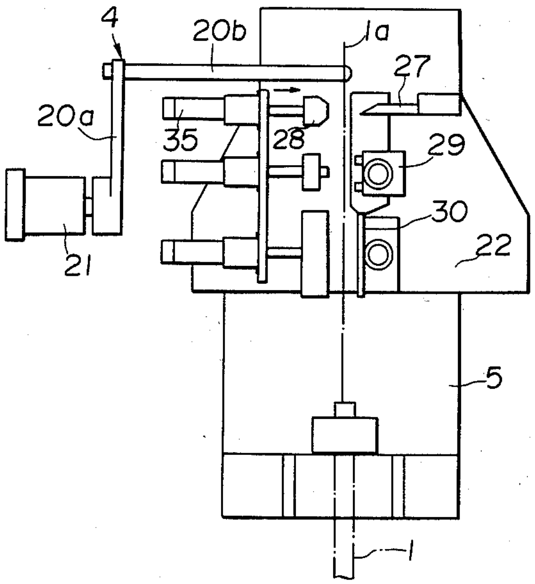
FIGS. 10A to 10D are schematic views showing the operations of a movable table of an arranging means and drive means associated therewith.

(i) The table 22 is disposed generally in vertical registry with the fixture 5 in the direction of movement of the table 22 along the threaded rod 24(FIG. 10A). The press elements 28, 31 and 32 are held in their retracted positions. The keeper plate 29 and the press plate 30 are held in their raised positions. In this condition, the wire 1a, held flat on the table 22 by the holder plates 20c and 20c of the transport means 4, is disposed between the press elements 28, 31, 32 and the blade-like electrode 27, keeper plate 29, press plate 30.

Figure 10B:
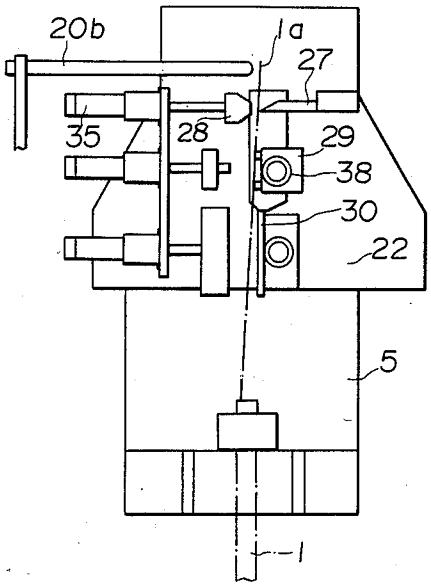

(ii) Then, the pneumatic cylinder 35 is operated to bring the press element 28 toward the blade-like electrode 27 so that the blade-like electrode 27 cuts through the insulation of the wire 1a to make electrical contact with the conductor of the wire 1a, as shown in FIG. 10B to feed the probe signal to the I/O interface 40. The other end of the wire 1a remote from the table 22 is connected to a selected one of the terminals of the I/O interface 40 so that the I/O interface 40 feeds data, representative of the identification of this wire 1a, to the microprocessor unit 17. Reference data, representative of the relationship between the order of terminals of I/O interface 40 and the order of the grooves of the fixture 5, stored in a memory of the microprocessor unit 17. Thus, the wire 1a can be identified through the microprocessor unit 17. When the wire 1a is held by the press element 28 and the blade-like electrode 27, the first and second links 20a and 20b of the transport mechanism 4 is angularly moved by the rotary actuator 21 away from the table 22 into its initial position, with the pair of holder plates 20c and 20 disengaging from the wire 1a.

Figure 10C:
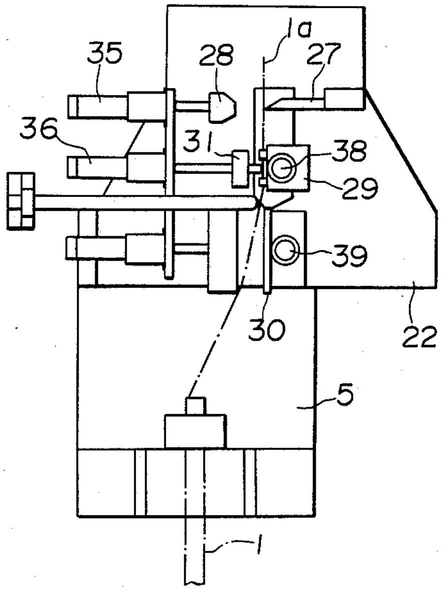

(iii) Then, the pneumatic cylinder 36 is operated to bring the press element 31 toward the keeper plate 29 so that the wire is held by the element 31 and the plate 29 (FIG. 10C). Then, the pneumatic cylinder 35 is operated to retract the press element 28 away from the blade-like electrode 27, and the stepping motor 25 is operated in accordance with the above-mentioned identification data through the microprocessor unit 17 to move the table 22 along the threaded rod 24 in such a manner that the wire 1a on the table 22 is brought into vertical registry or alignment with its corresponding one of the grooves 33 of the fixture 5. Generally, the wire 1a connected to Number n terminal of the I/O interface 40 is disposed in alignment with Number n groove 33 of the fixture 5.

Figure 10D:
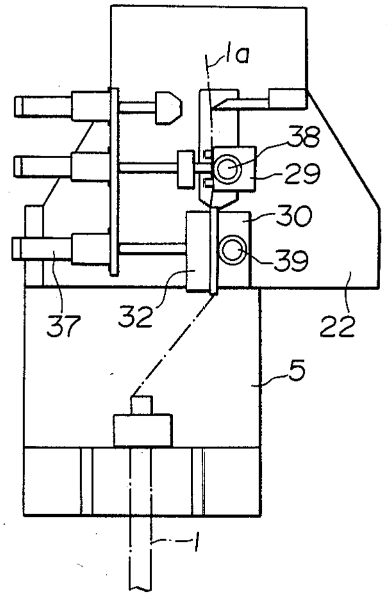

(iv) Then, the pneumatic cylinder 37 is operated to bring the press element 32 toward the pneumatic cylinder 39 so that the wire 1a is held by the element 32 and the cylinder 39, as shown in FIGS. 8A and 10D.

(v) Then, the pneumatic cylinder 38 is operated to lower the keeper plate 29 so that the pair of hooks 29a and 29a engage the wire 1a and lowers it through the slit 26, as shown in FIG. 9.

(vi) Soon after the downward movement of the keeper plate 29, the pneumatic cylinder 39 is operated to lower the press plate 30 so that the press plate 30 urges the wire 1a into its corresponding groove 33. Thus, the wire 1a is snugly received in the groove 33.

Then, the other wires 1a are sequentially fed from the wire feed means 3 through the transport means 4 on to the table 22 and are received in their corresponding grooves 33 of the fixture 5, respectively, in the above-mentioned manner. Thus, all of the wires 1a of one end of the cable 1 remote from the I/O interface 40 are arranged in the grooves 33 in the predetermined order.

The wires 1aarranged in the grooves 33 in the predetermined order are fixed with respect to one another by an adhesive tape or the like and are removed from the fixture 5. The ends of the wires 1aso arranged are then connected to a connector. The other ends of the wires 1a are also removed from the terminals of the I/O interface 40 and are connected to a connector to provide a connector cable.

The operation of a modified pick-up unit 3c will now be described with reference to FIGS. 11A to 11D.

Figure 11A:
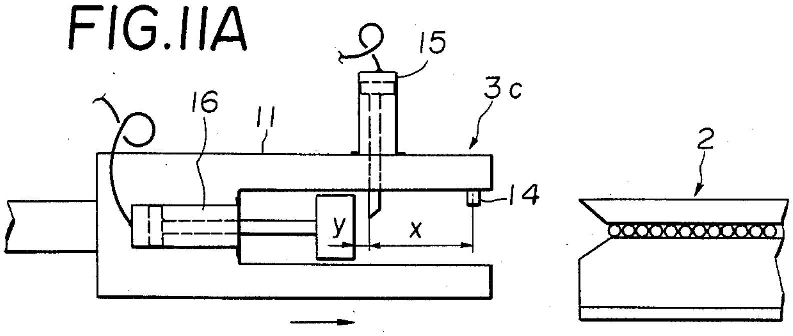
FIGS. 11A to 11D are views similar to FIGS. 5A to 5D but showing a modified pick-up unit.
Figure 11B:
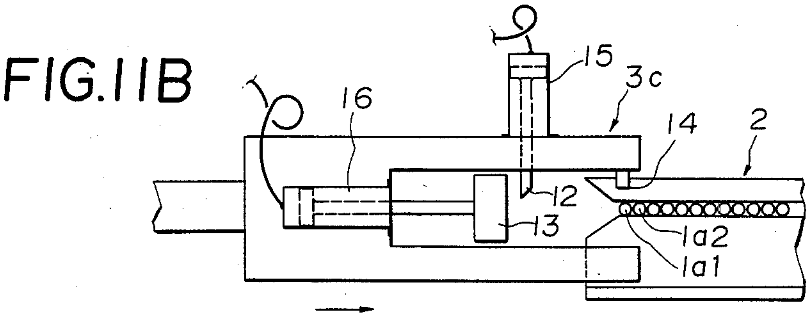

(i) A separator finger 12 is held in its retracted position, and a clamp plate 13 is held in a position spaced from the separator finger 12 by a distance y (FIG. 11A). The distance y is slightly less than the diameter D of the wire 1a.

(ii) Then, the pick-up unit 3c is moved toward the wire holder 2 by actuating the stepping motor 9 (FIG. 11B), so that a detector 14 detects the outermost wire 1a1.

(iii) When the detector 14 detects the outermost wire 1a1, the stepping motor 9 is stopped after the pick-up device 3c advances further by a predetermined distance L so that the separator finger 12 is disposed in a plane in which the adjacent wires 1a1 and 1a2 are in contact. This distance L is determined in the manner described above for the pick-up device 3b.

Figure 11C:
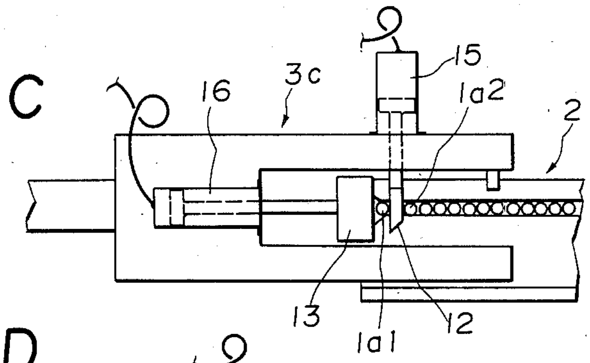
Figure 11D:
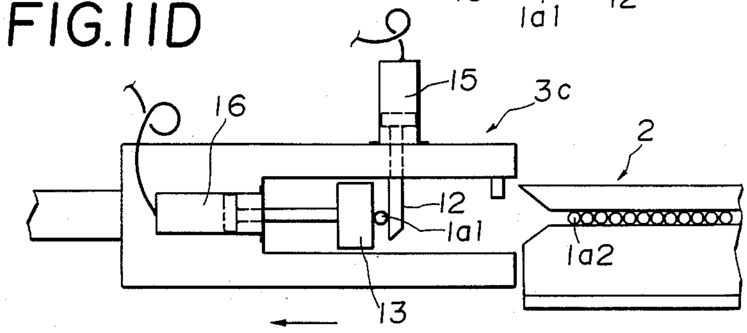

(iv) Then, the pneumatic cylinder 15 is operated to extend the separator finger 12 in between the adjacent wires 1a1 and 1a2 to separate them (FIG. 11C). Since the clamp plate 13 is spaced from the separator finger 12 by the distance y, the wire 1ais prevented from moving in a left-hand direction (FIG. 11C).

(v) Then, the pneumatic cylinder 16 is operated to urge the clamp plate 13 toward the separator finger 12 to hold the wire 1a1 therebetween. Then, the pick-up unit 3c is moved away from the wire holder 2 into a stand-by position by operating the stepping motor 9.

Figure 12:
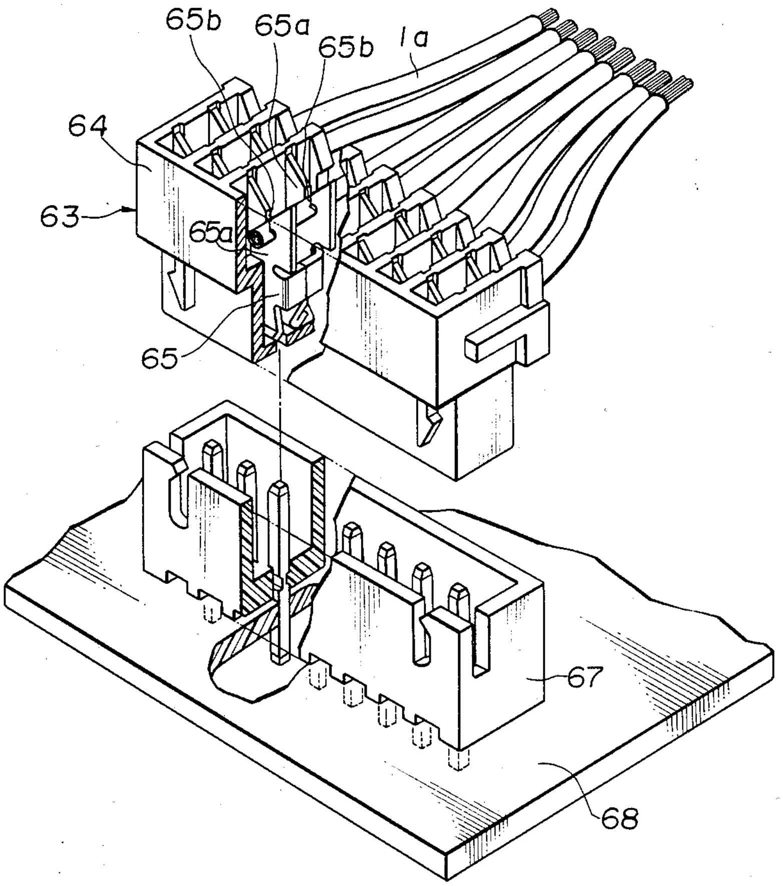
FIG. 12 is a perspective view of an electrical connector comprising male and female connector members.

According to another modified form of the invention, the raised portion 5b is removed from the fixture 5, and a male connector member 63 is detachably mounted on the fixture 5 beneath the table 22. The connector member 63 comprises an elongated body 64 of a synthetic resin and a plurality of juxtaposed contacts 65 of an electrical conductive metal secured to the body 64 and spaced along the length thereof. Each of the contacts 65 has a pair of opposed arms 65a and 65a spaced transversely of the elongated body 64. A pair of aligned slots 65b and 65b are formed in the opposed arms 65a and 65a, respectively, the pair of aligned slots 65b and 65b being spaced along the length of the slit 26 of the table 22. With this construction, according to the procedure described above for the preceding embodiments, the press plate 30 urges the wire 1a into the aligned slots 65b and 65b of a corresponding one of the contacts 65 so that the insulation of the wire 1a is torn by the edges of the aligned slots 65b and 65b to cause the conductor thereof to make electrical contact with the contact 65. In this manner, all of the wires 1a of one end of the cable 1 are connected to the contacts 65 in a predetermined order. Then, the male connector member 65 is detached from the fixture 5 and is adapted to be connected to a female connector member 67 (FIG. 12) mounted on a printed circuit board 68. Thus, in this embodiment, the aligned slots 65b of the contacts 65 serve as receptive sections.

In the illustrated embodiments, the order of the one ends of the wires 1a in the receptive sections, i.e., the grooves 33 or the slots 65b, is identical to the order of the other ends of the wires 1a connected to the terminals of the I/O interface 40, but the microprocessor 17 may be programmed to arrange the one ends of the wires 1a in the receptive sections 33 in a predetermined order not corresponding to the order of the other ends of the wires in the terminals of the I/O interface 40.

In the illustrated embodiment, the table 22 is designed to be movable with respect to the fixture 5 remaining stationary, but the fixture 5 may be movable with respect to the table 22 in which case the table 22 remains stationary.

The various pneumatic cylinders in the illustrated embodiments may be replaced by other suitable drive means such as a solenoid means.

What is claimed is:

1. A system for automatically arranging ends of wires of a connector cable in a predetermined order which comprises:

(a) a wire holder for holding one ends of the wires;

(b) a wire feed means operable to feed the wire ends one by one from said wire holder;

(c) a transport meahs operable to transport each wire end from said wire feed means;

(d) an arranging means including (i) a fixture mounted on a base and having a plurality of parallel receptive sections arranged in a preselected manner and disposed in a common plane, (ii) a table mounted on the base adjacent to said fixture and having a slit formed therethrough and extending parallel to said receptive sections, said table being movable in a direction perpendicular to said receptive sections in parallel relation to said common plane, each wire end being moved on to said table by said transport means, (iii) a probe means operable to make electrical contact with the wire end to feed a probe signal, (iv) a first drive means operable to move said table, (v) a second drive means operable to bring the wire end into alignment with said slit, and (vi) a third drive means operable to urge the wire end, disposed in alignment with said slit, into a selected one of said receptive sections through said slit; and (e) a control means to which the other ends of the wires are electrically connected, said control means being responsive to said probe signal to operate said first drive means to move said table, thereby bringing said slit of said table into alignment with the selected receptive sections of said fixture corresponding to the probed wire end, said control means being responsive to said probe signal to operate said second and third drive means to bring the wire end into alignment with said slit and to urge the wire end into the selected receptive sections through said slit.

2. A system according to claim 1, in which said wire feed means includes a pick-up unit mounted on the base and a fourth drive means operable to move said pick-up unit between said wire holder and said transport means, said pick-up unit including a body, a separator finger movably mounted on said body, a fifth drive means mounted on said body and operable to move said separator finger, a clamp plate, a sixth drive means operable to move said clamp plate toward and away from said separator finger, and a detector means for detecting an outermost one of the wire ends held by said wire holder to feed a detecting signal, said control means being responsive to said detecting signal to deactivate said fourth drive means to stop said pick-up unit when said pick-up unit is moved toward said wire holder, said control means being responsive to said detecting signal to operate said fifth drive means to move said separator finger in between the outermost wire end and the adjacent wire end both held by said wire holder, said control means being responsive to said detecting signal to operate said sixth drive means to move said clamp plate toward said separator finger to hold the outermost wire end therebetween, and said control means being responsive to said detecting signal to operate said fourth drive means to move said pick-up unit toward said transport means after the outermost wire end is held between said separator finger and said clamp plate.

3. A system according to claim 1, in which said transport means comprises a link having at one end a pair of opposed resilient holder plates secured thereto at one ends thereof, and a seventh drive means mounted on the base and operable to move said link toward said wire holder to cause said pair of holder plates to resiliently hold therebetween an outermost one of the wire ends held by said wire holder, and operable to further move said link to bring said outermost wire end toward said table, said control means controlling the operation of said seventh drive means.

4. A system according to claim 1, in which said wire holder comprise a body of a U-shaped cross-section defined by a pair of parallel spaced arms and a base portion interconnecting said arms at their one ends, said arms having aligned slots for inserting the wire ends thereinto and holding them in juxtaposed relation.

* * * * *

UNITED STATES PATENT AND TRADEMARK OFFICE

CERTIFICATE OF CORRECTION

PATENT NO. : 4,557,046

DATED : December 10, 1985

INVENTOR(S) : Fumio Suzuki, et al.

It is certified that error appears in the above-identified patent and that said Letters Patent is hereby corrected as shown below:

| | |
|---|---|
| Col. 3, line 58 | Before "L" delete "ti" |
| Col. 3, line 62 | Delete "lal" and substitute --la-- |
| Col. 6, line 17 | Before "terminals" insert --the-- |
| Col. 6, line 63 | Insert space between "la" and "arranged" |
| Col. 6, line 66 | After "wires la" insert a space |
| Col. 7, line 25 | Delete "lais" and substitute --lal is-- |
| Col. 8, line 16 | Delete "meahs" and substitute --means-- |

Signed and Sealed this

*First* Day of *April 1986*

[SEAL]

*Attest:*

DONALD J. QUIGG

*Attesting Officer*

*Commissioner of Patents and Trademarks*